US005638356A

United States Patent [19]
Hijikata

[11] Patent Number: 5,638,356
[45] Date of Patent: Jun. 10, 1997

[54] ORDER WIRE RELAY METHOD AND APPARATUS

[75] Inventor: Toshiyuki Hijikata, Kawasaki, Japan

[73] Assignee: Fujitsu Limited, Kanagawa, Japan

[21] Appl. No.: 302,501

[22] Filed: Sep. 8, 1994

[30] Foreign Application Priority Data

Jan. 31, 1994 [JP] Japan ................................. 6-009978

[51] Int. Cl.$^6$ ....................................................... H04J 3/12
[52] U.S. Cl. ............................................ 370/395; 370/474
[58] Field of Search .............................. 370/13, 60, 60.1, 370/79, 94.1, 94.2, 110.1

[56] References Cited

U.S. PATENT DOCUMENTS

| | | | |
|---|---|---|---|
| 5,185,736 | 2/1993 | Tyrrell et al. | 370/55 |
| 5,214,642 | 5/1993 | Kunimoto et al. | 370/79 X |
| 5,315,594 | 5/1994 | Noser | 370/110.1 |
| 5,359,600 | 10/1994 | Ueda et al. | 370/60.1 |
| 5,402,414 | 3/1995 | Asai | 370/58.2 |

Primary Examiner—Russell W. Blum

[57] ABSTRACT

The present invention, in an ATM (Asynchronous Transfer Mode) which houses data in fixed length packets known as cells and transmits them to a receiving end, has as its object to provide a technology which can relay and transmit, within an ATM exchange, overhead section control information and can effectively perform maintenance and management of a communication network. Also, the order wire apparatus of the present invention comprises a network end device between a subscriber terminal and an exchange, this network end device comprising a frame data preparing means for simultaneously mapping communication data transmitted from a subscriber terminal into the payload section of frame data and mapping control information input by a maintenance worker into the overhead section of the frame data. And, the exchange comprises data separating means for separating the frame data transmitted from the network end device into the payload section and overhead section, a cell producing means for forming the payload section and overhead section into individual cells, and a multiplexing means for multiplexing these cells and transmitting them to the receiving end exchange.

12 Claims, 11 Drawing Sheets

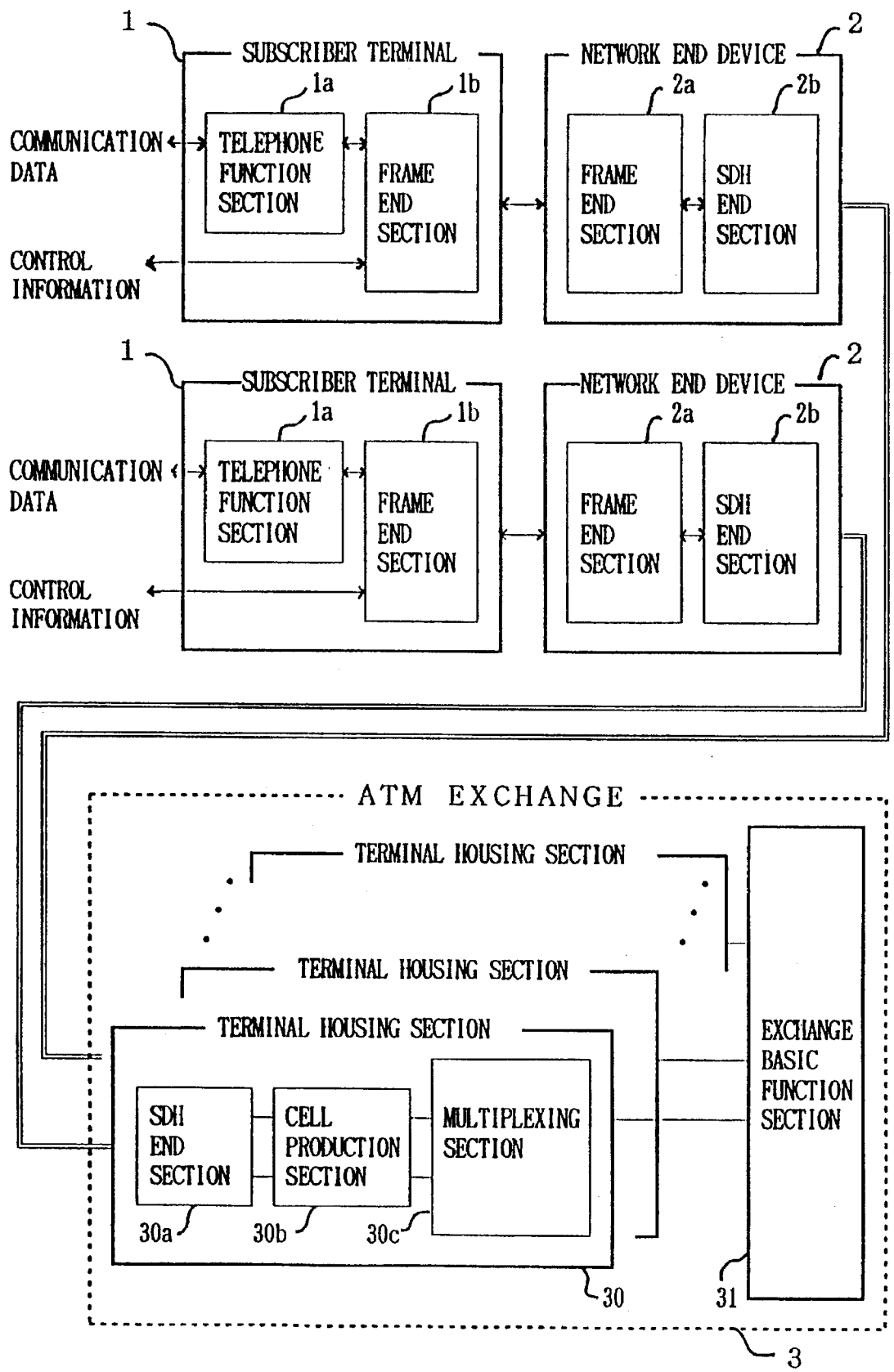
F I G. 6

| | | | |
|---|---|---|---|
| Section Overhead | Framing A1 | Framing A2 | STS-1 ID C1 |
| | BIP-8 B1 | Orderwire E1 | User F1 |
| | Data Com D1 | Data Com D2 | Data Com D3 |
| Line Overhead | Pointer H1 | Pointer H2 | Pointer Action H3 |
| | BIP-8 B2 | APS K1 | APS K2 |
| | Data Com D4 | Data Com D5 | Data Com D6 |
| | Data Com D7 | Data Com D8 | Data Com D9 |
| | Data Com D10 | Data Com D11 | Data Com D12 |
| | Growth Z1 | Growth/FEBE Z2 | Orderwire E2 |

FIG. 11

ORDER WIRE RELAY METHOD AND APPARATUS

BACKGROUND OF THE INVENTION

(1) Field of the Invention

The present invention relates to a method for transmitting and receiving an order wire, used in the maintenance of transmission paths such as SONET, SDH and the like as well as relay devices, between exchanges of ATM networks.

(2) Prior Art

Recently, in order to realize broadband services in the B-ISDN (Broadband Integrated Service Digital Network), simultaneous networks by means of multiplex transmission such as SONET (Synchronous Optical Network) which is the standard method of the North American system, SDH (Synchronous Digital Hierarchy) which has been adopted as the international standard centering on Europe, and the like, have been proposed.

This type of simultaneous network transmits and receives data of a frame structure, formed by a payload section made by multiplexing a number of communication data items whose transmission speeds differ, and an overhead section which is added to the head of the payload data and stores control information for maintaining and managing networks.

The format of the overhead in SDH is shown in FIG. 11.

The overhead of SDH comprises a relay section overhead and a multiplex section overhead.

The relay section overhead is a region for storing control information relating to the maintenance and management of a transmission path connecting relay device to relay device, and has a 9-byte data region of a triple-layered frame structure.

The multiplex section overhead is a region for storing control information relating to the maintenance and management of the relay device and the transmission path for connecting between one end-station relay device and another end-station relay device, and has a 9-byte data region of a five-layered frame structure.

Further, between the relay section overhead and the multiplex section overhead, a 1 (byte)×1 (layer) pointer is included. This pointer is a pointer for indicating the position of a path overhead which stores information concerning the paths of each item of the multiplexed data.

Also, an order wire region for storing audio data is provided in the multiplex section overhead. Further, there is also a region known as BIP-8 for storing audio data in the relay section overhead.

According to this type of the method, a network maintenance worker can map, in frame structure overheads, information relating to faults in and restoration of transmission paths, information relating to faults in and restoration of relay devices, and information relating to faults in and restoration of end-station relay devices. Accordingly, the above method has the advantage of being able to effectively perform detection of fault information in a communication process and detection of restoration information.

SUMMARY OF THE INVENTION

Recently, development of ATM (Asynchronous Transfer Mode) which stores data in packets of fixed length known as cells and transmits them to a receiver, has been progressing. The inventors of the present invention are targeting the order wire of an overhead portion utilized on simultaneous networks, and have as their objective to provide a technology which can relay/transmit maintenance and management information relating to transmission paths connecting network end devices and subscriber terminals and transmission paths connecting network end devices and ATM exchanges, as well as effectively perform maintenance and management of communication networks.

In order to achieve the above object the order wire relay method and device of the present invention employ structures such as the following.

Order Wire Relay Method

The order wire relay method of the present invention is a method suitable for communication networks and which separates frame data, comprising a payload section for registering communication data including audio, data and images and an overhead section for registering maintenance and management control information, into cells of fixed length.

The order wire relay method comprises the following processing procedure to be executed by a network end device.

(1) Payload mapping step
(2) Overhead mapping step

Here, the payload mapping step of (1) includes a process of mapping communication data transmitted from a subscriber terminal into the payload section of the frame data.

The overhead mapping step of (2) includes a process of mapping control information input by the maintenance worker into the overhead section of the frame data.

Then, the network end device, after executing the payload mapping step and the overhead mapping step, executes a frame data transmission step for transmitting the frame data to an exchange.

According to the result of the above, the exchange will execute the following processing procedure.

(3) Frame data receiving step
(4) Data separation step
(5) Cell production step
(6) Multiplexing step The frame data receiving step of (3) above includes a process for receiving the frame data transmitted from the network end device.

The data separation step of (4) includes a process of separating the frame data received in the frame data receiving step into a payload section and an overhead section.

The cell production step of (5) includes a process of forming the data of the payload section and the data of the overhead section into individual cells.

Further, the multiplexing step of (6) includes a process of multiplexing cell groups produced by the cell production step and transmitting them to the receiving network.

Also, the exchange executes the following steps where receiving multiplexed cell groups from the receiving network.

(7) Cell receiving step
(8) Cell identification step
(9) Payload restoring step
(10) Overhead restoring step
(11) Frame data restoring step
(12) Transmission step The cell receiving step of (7) above includes a process of receiving cell groups transmitted from the receiving end.

The cell identification step of (8) includes a process of identifying the cell groups received in the cell receiving step as payload section cells and overhead section cells.

The payload restoring step of (9) includes a process of separating the cells of the payload section identified in the cell identification step and restoring the communication data of the payload section.

The overhead restoring step of (10) includes a process of separating the cells of the overhead section identified in the cell identification step and restoring the control information of the overhead section.

The frame data restoring step of (11) includes a process of combining the payload section restored in the payload restoring step and the overhead section restored in the overhead restoring step and restoring the original frame data.

Further, the transmission step of (12) includes a process of transmitting the frame data restored in the frame data restoring step to a network end device.

According to the result of the above, the network end device will execute the following steps.
(13) Frame data receiving step
(14) Frame data separation step
(15) Communication data transmission step
(16) Control information transmission step Here, the frame data receiving step of the above (13) includes a process of receiving the frame data transmitted from the exchange.

The frame data separation of (14) includes a process of separating the frame data received in the frame data receiving step into payload section communication data and overhead section control information.

The communication data transmission step of (15) includes a process of transmitting the payload section communication data to a subscriber terminal.

The control information transmission step of (16) includes a process of transmitting the overhead section control information to a maintenance worker.

Further, the cell production step of the present invention may also include a step of forming the overhead section data into cells by means of a CBR method.

Also, the exchange of the present invention may also execute a step of setting a communication data designation between the subscriber terminal and the receiving end subscriber terminal and a step of transmitting a designation setting request including terminal identification information specifying the subscriber terminal, and setting a control information designation.

Next, a brief description of the order wire relay device of the present invention will be given.

Order Wire Relay Device

The order wire relay device of the present invention is of a structure which comprises a network end device between a subscriber terminal and an exchange, in a communications network which separates frame data, comprising a payload section for registering communication data including audio, data and images and an overhead section for registering maintenance and management control information, into cells of fixed length and transmits and receives them.

Then, the network end device comprises a frame data preparation means. This frame data preparation means has a function of mapping into the overhead section of the frame data control information input by the maintenance worker at the same time as mapping into the payload section of the frame data communication data transmitted from a subscriber terminal.

Further, the frame data preparation means has a function of transmitting the prepared frame data to an exchange.

Next, the exchange may also comprise a frame data transmission/reception means, a data separating means, a cell production means and a multiplexing means.

The frame data transmission/reception means has a function of performing transmission/reception of frame data between itself and a network end device.

The data separating means has a function of separating the frame data received by the frame transmission/reception means into a payload section and an overhead section.

The cell production means has a function of individually forming into cells the payload section and overhead section separated by the data separating means.

The multiplexing means has a function of multiplexing the cell groups produced by the cell production means and transmitting them to a receiving network.

Also, the multiplexing means of the exchange has a function of separating the cell groups into payload section cells and overhead section cells where multiplexed cell groups are received from the receiving network.

Then, the cell production means has a function of analyzing the cells of the overhead section and restoring control information of the overhead section, at the same time as analyzing the cells of the payload section separated by the multiplexing means and restoring the communication data of the payload section.

Further, the data separating means has function of combining the communication data of the payload section and the control information of the overhead section restored by the cell production section, and preparing original frame data.

The frame data transmission/reception means has a function of transmitting frame data prepared by the data separating means to a network end device.

In accordance with this, the frame data preparing means of the network end device has a function of separating the frame data into communication data of the payload section and control information of the overhead section when it has received the frame data from the exchange, and at the same as transmitting the communication data of the payload section to the subscriber terminal, transmitting the control information of the overhead section to the maintenance worker.

Here, in the over wire relay device of the present invention, the cell production means may also have a function of forming the data of the overhead section into cells by means of the CBR method.

Also, the exchange may also comprise a function for, after setting a communication data designation between a subscriber terminal and a receiving subscriber terminal, transmitting a designation setting request including terminal identification information for specifying the subscriber terminal to the network of the receiver and setting a control information designation. In detail, the exchange, having received a designation setting request from the subscriber terminal, discriminates the exchange accommodated by the receiving subscriber terminal, transmits a designation setting request to that exchange, and sets a designation. Subsequently, the exchange notifies the receiving exchange of a designation setting request signal which maps terminal identification information for setting the subscriber terminal and sets the designation for control information. According to the order wire relay method and apparatus of the present invention, data of an overhead section used in a simultaneous network such as SONET, SDH and the like can be transmitted even between ATM exchanges, and maintenance, operation and management of ATM networks can be performed effectively.

BRIEF DESCRIPTION OF THE DRAWINGS

These and other features, aspects and advantages of the present invention will become better understood with reference to the following description, appended claims and accompanying drawings wherein

FIG. 6 is a block diagram showing a second communication network in the second embodiment;

FIG. 11 shows a format of an overhead section in the SDH method.

DESCRIPTION OF PREFERRED EMBODIMENTS

An explanation of the embodiments of the present invention will now be given with reference to the drawings.

(EMBODIMENT 1)

Figure 1:
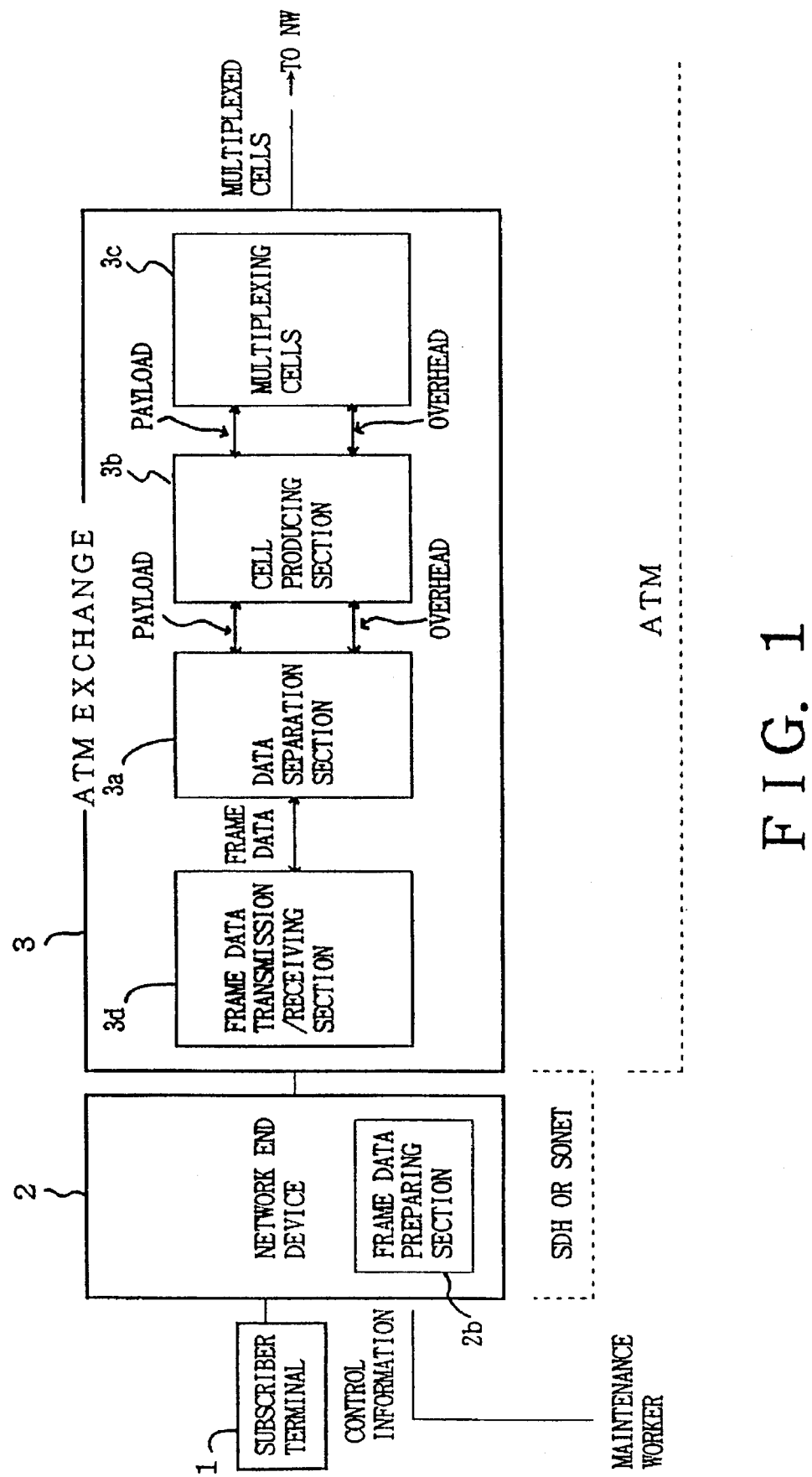
FIG. 1 is a structural diagram of an order wire relay device of a first embodiment.

An explanation of the structure of an order wire relay device of a first embodiment will be given along the lines of FIG. 1.

The order wire relay device connects a network end device 2 between a subscriber terminal 1 and an exchange 3. A simultaneous network method such as SONET, SDH or the like is employed in a transmission path connecting the subscriber terminal 1 and the network end device 2 and in a transmission path connecting the network end device 2 and the exchange 3. Further, the exchange 3 and another exchange is connected by an ATM system network.

The network end device 2 comprises a frame data preparing section 2b for mapping communication data transmitted from the subscriber terminal 1 into the payload section of the frame data and mapping the control information input by the maintenance worker into the overhead section of the frame data. The frame data preparing section 2b has a function for, in cases where the frame data is received from the exchange 3, separating it into the communication data of the payload section and the control information of the overhead section, and transmitting the control information to the maintenance worker at the same time as transmitting the communication data to the subscriber.

Meanwhile, the exchange 3 comprises a frame data transmission/reception section 3d, a data separating section 3a, a cell production section 3b and a multiplexing section 3c.

The frame data transmission/reception section 3d has a function for transmitting from data to and receiving frame data from and the network end device 2.

The data separating section 3a has a function for separating the frame data received by the frame data transmission/reception section into a payload section and an overhead section.

The cell production section 3b has a function for forming the payload section and overhead section separated by the data separation section 3a into individual cells.

The multiplexing section 3c has a function of multiplexing the cells produced by the cell production section 3b and transmitting them to the exchange accommodating the receiving end subscriber terminal.

Meanwhile, the above sections, when receiving multiplexed cell groups from the receiving end exchange 3, execute the following processes.

The cell multiplexing section 3c executes a process of identifying the cell groups as payload section cells and overhead section cells.

Then, the cell production section 3b executes a process of separating the cells identified by the cell multiplexing section 3c, and restoring the control information of the overhead section at the same time as restoring the communication data of the payload section.

The data separating section 3a executes a process of combining the communication data of the payload section and the control information of the overhead section restored by the cell production section 3b and producing original frame data.

Note that, as a method of forming the overhead section into cells, a CBR method for producing cells by a fixed bit rate is employed.

Also, the frame data preparing section 2b of the network end device 2 has a function of, when receiving the frame data from the exchange 3, separating the frame data into data of the payload section and data of the overhead section, and at the same time as transmitting the data of the payload section to the addressee subscriber terminal 1, transmitting the data of the overhead section to the maintenance worker.

The functions of the network end device 2 may also be provided by the subscriber terminal 1.

Also, a function of setting a communication data designation between the network end device 2 and the receiving network end device and a function of setting a designation of the control information are provided in the exchange 3. In other words, the exchange 3, upon receiving a designation setting request from the subscriber terminal 1, determines the exchange accommodating the receiving end subscriber terminal, and after transmitting a designation setting request to that exchange and setting a designation, notifies the receiving exchange of a designation setting request signal which maps terminal identification information specifying the subscriber terminal 1, and sets a control information designation.

(EMBODIMENT 2)

Figure 2:
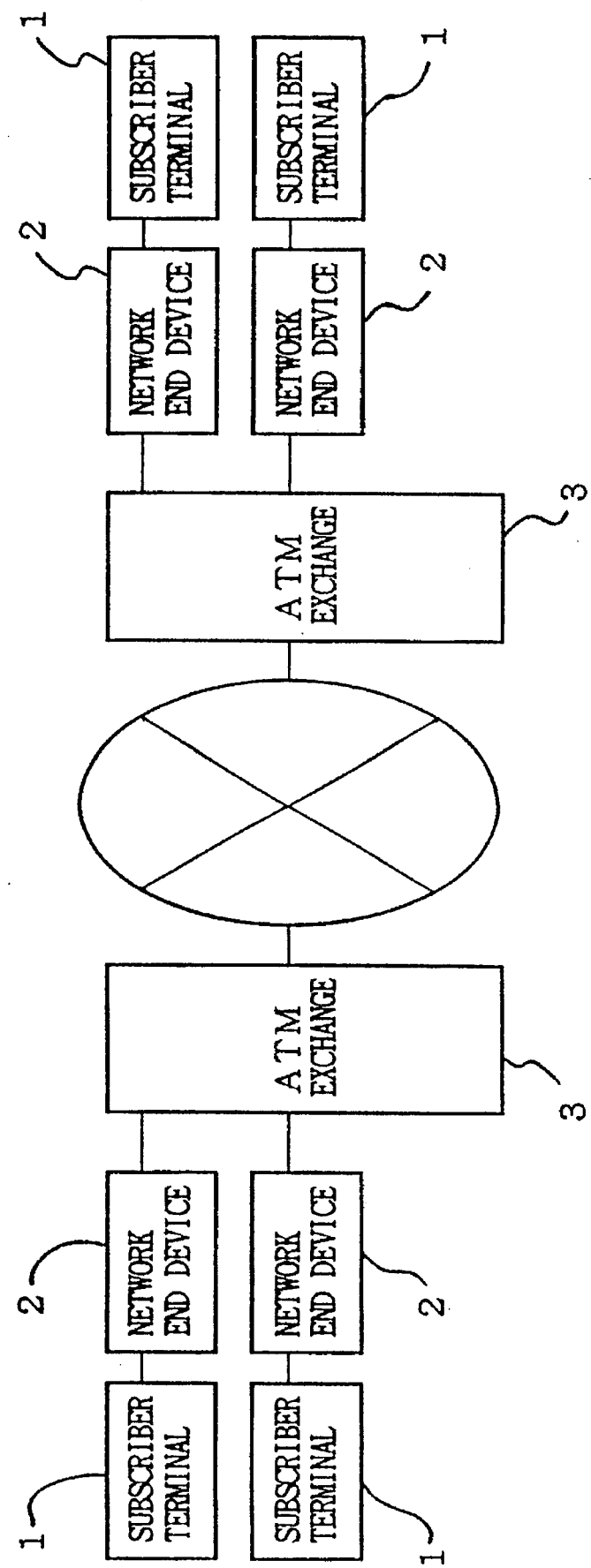
FIG. 2 is an overall block diagram of a communication network in a second embodiment.

The overall structure of a communication network in a second embodiment of the present invention is shown in FIG. 2.

In the present embodiment a network end device 2 is connected to end subscriber terminal 1 and an ATM exchange 3 is connected to the network end device 2. Further, the ATM exchange 3 and another ATM exchange 3 are connected by the ATM system network.

The above exchange end device and the ATM exchange 3 are connected by an SDH system transmission path.

Figure 3:
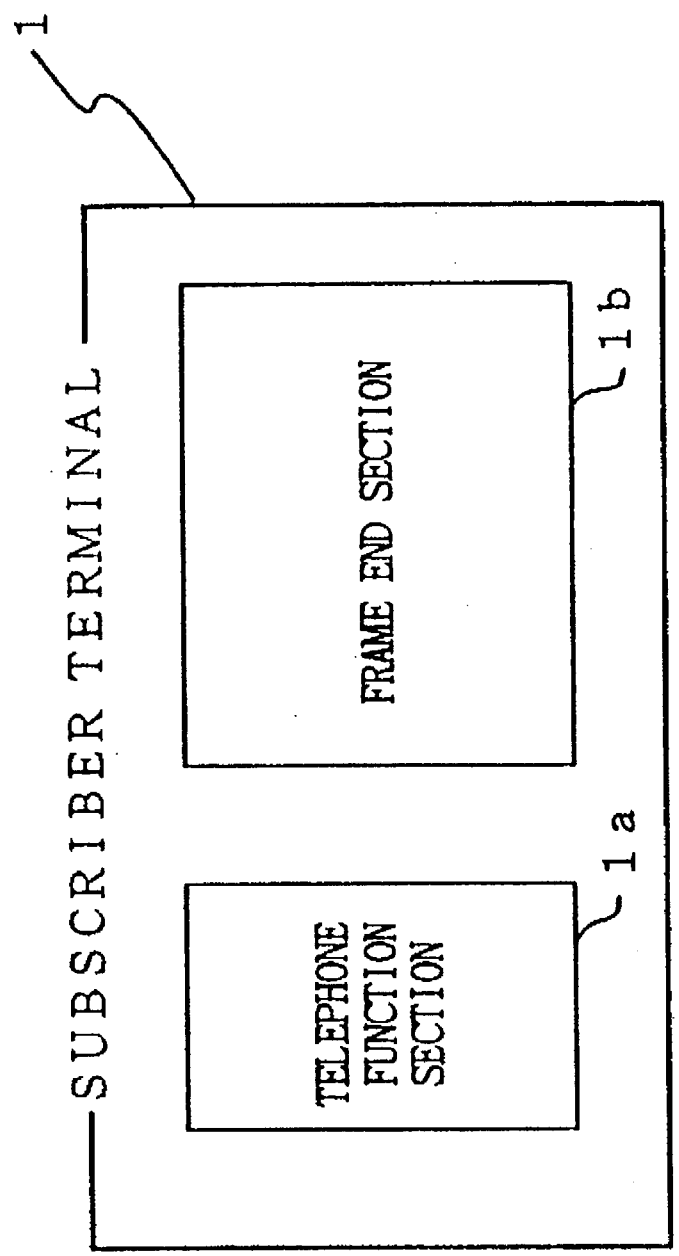
FIG. 3 is a block diagram of a subscriber terminal in the second embodiment.

FIG. 3 is a block diagram showing the various functions of the internal structure of the subscriber terminal 1 of the present embodiment.

The subscriber terminal 1 comprises a telephone function section 1a for realizing functions as a telephone, and a frame end section 1b for interfacing with the transmission path.

The frame end section 1b has a function of converting SDH format communication data transmitted from the network end device 2 into data capable of being processed by the subscriber terminal 1 and transferring it to the telephone function section 1a, and a function of converting communication data transmitted from the telephone function section 1a into SDH format data capable of being transmitted.

The telephone function section 1a has a function of converting from analog signals to digital signals sound, images and data input by the subscriber and transferring them to the frame end section 1b, and in addition converting communication data transferred from the frame end section 1b from digital signals into analog signals and outputting them from output devices (not shown in the drawing) such as speakers, a display, a printer or the like.

Figure 4:
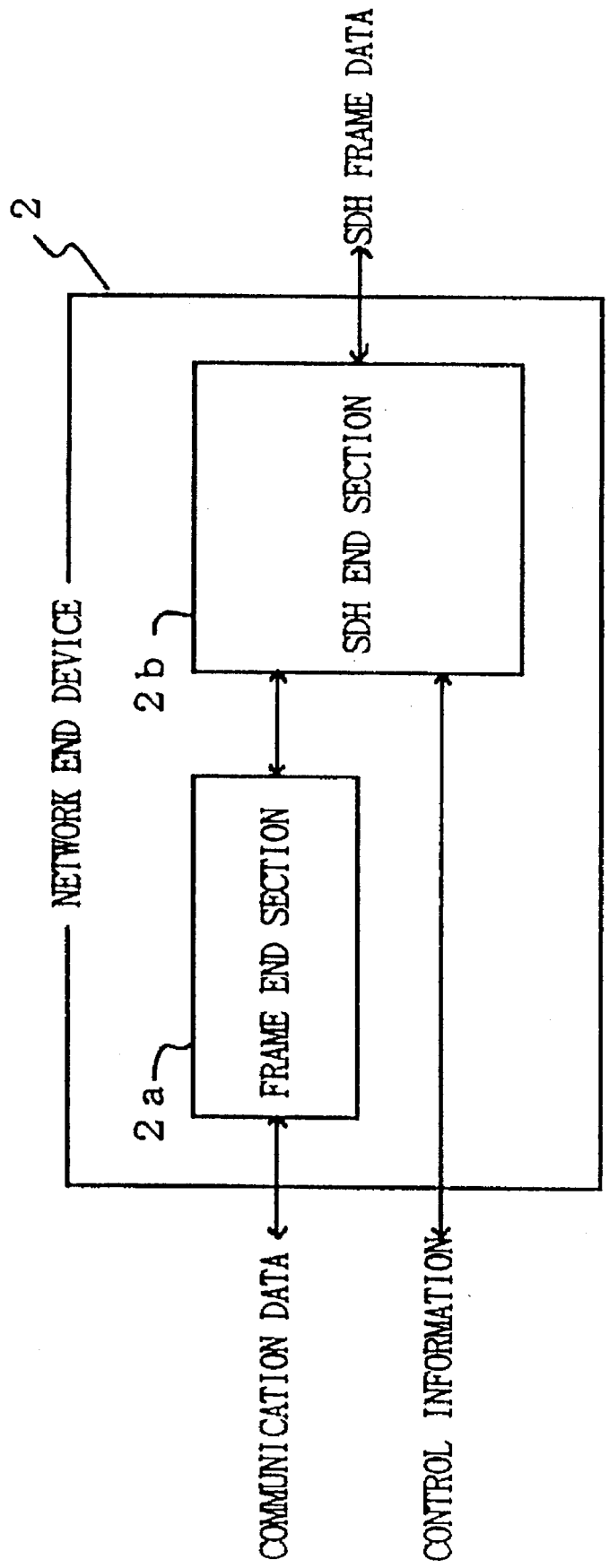
FIG. 4 is a block diagram a network end device in the second embodiment.

The network end device 2 comprises a frame end section 2a for interfacing with a transmission path connecting it to the subscriber terminal 1 and an SDH end section 2b as the frame data preparing means of the present embodiment (see FIG. 4).

The SDH end section 2b has a function of mapping communication data output from the frame end section 2a in SDH format data and transmitting it to the ATM exchange 3, and in addition extracting communication data from SDH format frame data received from the ATM exchange.

Also, a maintenance console (not shown) for performing maintenance and management of the network is connected to the network end device 2, and the SDH end section 2b has a function of mapping control information transmitted form the maintenance console into SDH format frame data. For example, the SDH end section 2b maps communication data into the payload section of the SDH format frame data and maps control information into the over wire region and the BIP-8 region of the overhead section.

Figure 5:
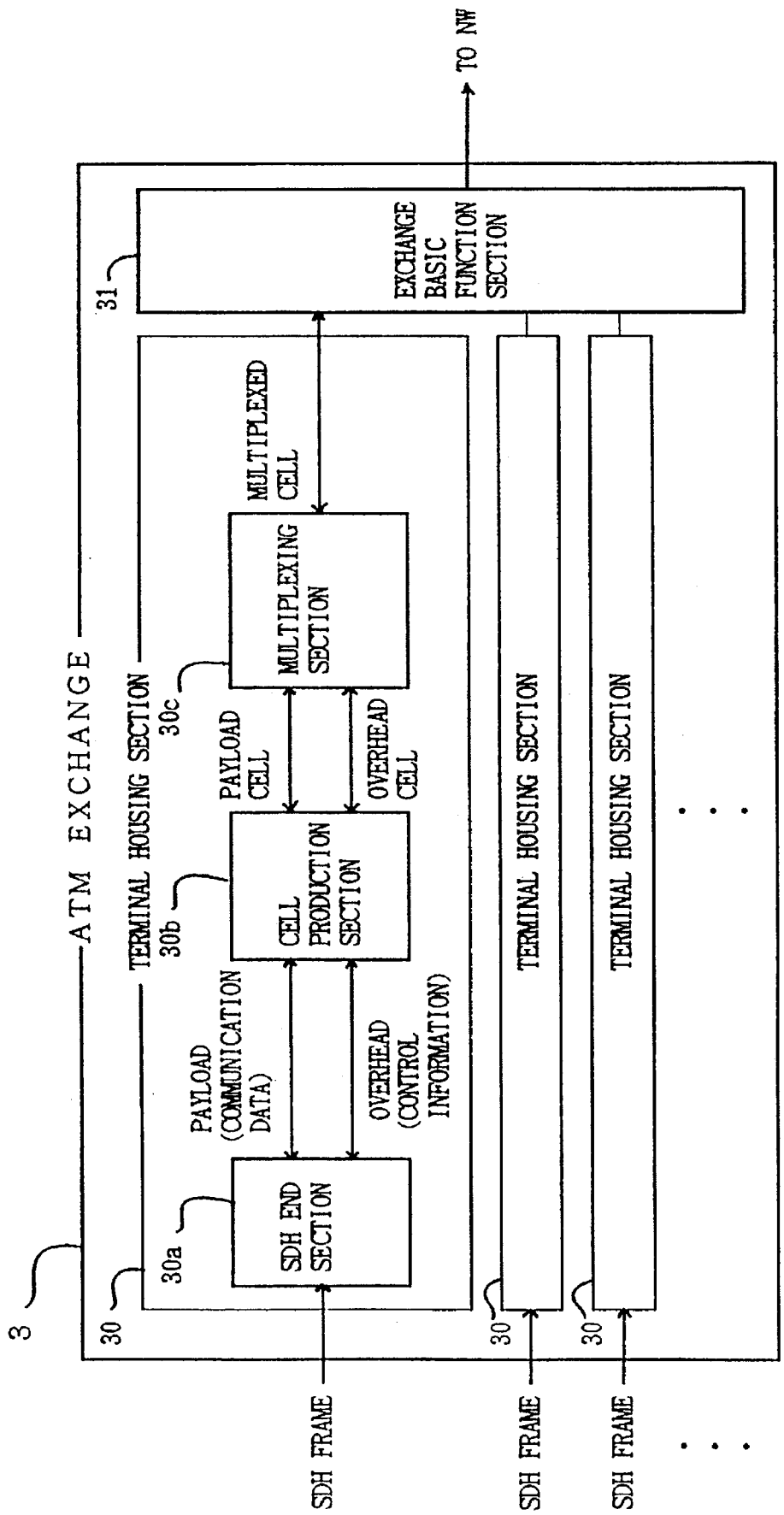
FIG. 5 is a block diagram of an ATM exchange in the second embodiment.

Next, the functional structure of an ATM exchange of the second embodiment is shown in FIG. 5.

In this drawing, the ATM exchange 3 has a terminal housing section 30 for each subscriber terminal, as well as an exchange basic function section 31.

The exchange basic function section 31 realizes basic functions of the exchange such as a switching process for performing connection and disconnection of communication lines, a data transmission/reception and accounting process, and the like.

Each terminal housing section 30 comprises an SDH end section 30a, a cell production section 30b and a multiplexing section 30c.

The SDH end section 30a is a concrete example for realizing the frame data transmission/reception means 3d and the data separating means 3a of the present invention, and has an interface function of converting data received via the SDH format transmission path set between the ATM exchange 3 and the network end device 2 into a data format capable of processing in the ATM exchange 3. It also has a function of converting data to be transmitted to the network device 2 into a data format capable of being transmitted by the transmission path. Further, this SDH end section 30a has a function of separating ADH format frame data received from the network end device 2 into communication data of the payload section and control information of the overhead portion.

The cell production means 30b has a function of separating the communication data and control information separated by the SDH end section 30a into fixed length data as well as for attaching headers to each item of separated data and producing cells, and a function of separating the cells received from the ATM network and restoring the original communication data and control information. Here, the SDH end section 30a has a function of combining the communication data and control information restored by the cell production means 30b and producing SDH format frame data. This cell production section 30b comprises a payload cell forming section for forming the communication data of the payload section into cells and an overhead cell forming section for forming the control information of the overhead section into cells. Note that the overhead cell forming section forms the control information mapped in the overhead section into cells by the CBR method.

The multiplexing section 30c has a function of multiplexing the communication data and control information formed into cells by the terminal housing sections 30 and transmitting them to the ATM network, and a function of separating multiplexed cell groups when receiving the multiplexed cell groups from the ATM network to separate them into payload section cells and overhead section cells.

Herebelow, the communication processing procedure of the present embodiment will be explained.

The network end device 2, upon receiving a designation setting request from the subscriber terminal 1, transfers the designation setting request to the ATM exchange 3.

The ATM exchange 3 transmits the designation setting request received from the network end device 2 to the receiving ATM exchange 3.

Upon completion of setting of the communication path, the ATM exchange 3 transmits a designation setting request signal (for example a SETUP signal) to set a control information path to the receiving ATM exchange. This designation setting request signal maps housing position information specifying a terminal housing portion 30 housing the subscriber terminal. Then, upon receiving a designation setting request reception signal (for example a SETUP ACK signal) from the receiving side, a control information path is set up between the network end device 2 and the network end device 2 of the receiving side.

Upon completion of the setting of the communication path and control information path, a designation setting completion notification is transmitted to the network end device 2 and the subscriber terminal 1.

Here, the subscriber of the subscriber terminal 1 transmits communication data such as sound, images, data or the like, and the maintenance worker transmits control information from the maintenance console.

In the network end device 2 the frame end section 2a receives the communication data and control information. Then, the SDH end section 2b maps the control information into the overhead section of the SDH frame data at the same time as mapping the communication data into the payload section of the SDH frame data, and transmits them to the ATM exchange 3.

In the ATM exchange, the terminal housing section 30 receives the SDH frame data.

Here, in the terminal housing section 30 the SDH end section 30a separates the SDH frame data into communication data of the payload section and control information of the overhead section. Then, the cell production section 30b, at the same time as forming the communication data of the payload section into cells, forms the control information of the overhead section into cells by the CBR method.

Next, the multiplexing section 30c multiplexes the cells of the payload section and the cells of the overhead section formed into cells by the cell production section 30b, and transmits them to the exchange basic function section 31.

The exchange basic function section 31 transmits the cells by the connection set to and receives the cells from the receiving end ATM exchange 3.

On the other hand, when multiplexed cells are received from the receiving side ATM exchange 3, the exchange basic function section 31 transfers the cells to the terminal housing section 30.

In the terminal housing section 30, the multiplexing section 30c separates the multiplexed cells into payload section cells and overhead section cells and transfers them to the cell production section 30b.

The cell production section 30b analyzes the cells of the payload section and restores the communication data of the payload section, and simultaneously analyzes the cells of the overhead section and restores the control information of the overhead section, then transfers these data to the SDH end section 30a.

The SDH end section 30a combines the communication data of the payload section and the control information of the overhead section to produce SDH frame data, and transmits this to the network end device 2.

In the network end device 2, the SDH end section 2b analyzes the SDH frame data to separate the communication data and control information, and as well as transmitting the communication data to the subscriber terminal 1, transmits the control information to the control console.

As described above, according to the present embodiment, relaying the control information of the overhead section between ATM exchanges becomes possible by forming the control information of the overhead section into cells by the CBR method and multiplexing it along with the cells of the communication data.

Note that, in the second embodiment, although the control information is transmitted from the maintenance console to the receiving end maintenance console, it is also permissible for a subscriber of an individual subscriber terminal 1 to transmit it to an addressee subscriber (see FIG. 6). In this case, a region for mapping communication data and a region for mapping control information must be previously defined in the frame data transmitted and received between the subscriber terminal 1 and the network end device 2 in the same way as the SDH system frame data.

Figure 7:
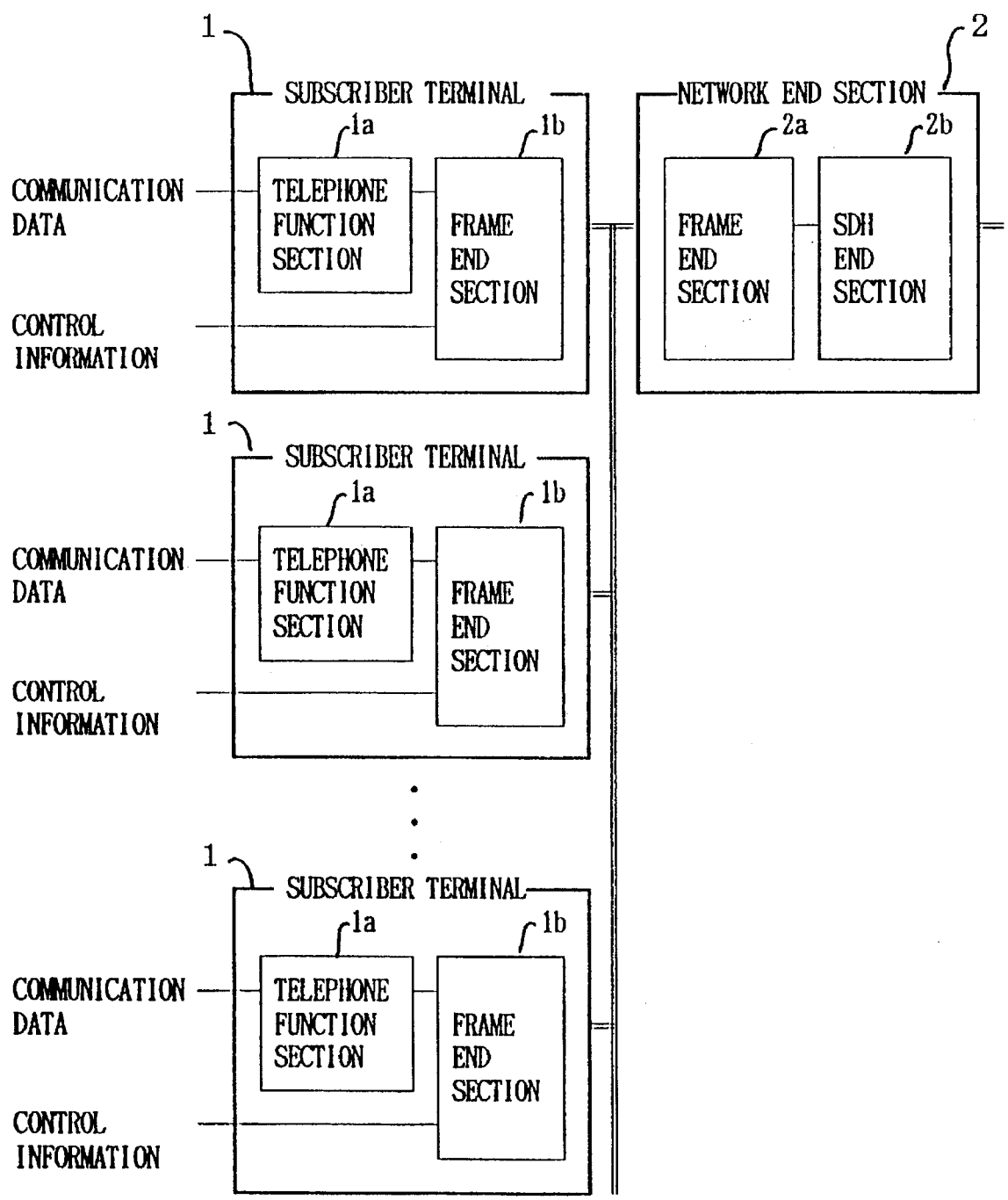
FIG. 7 is a block diagram showing a third communication network in the second embodiment.

Also, in the second embodiment, although a network end device 2 is connected to each subscriber terminal, it is also permissible to connect a single network end device 2 commonly to a number of subscriber terminals 1 (see FIG. 7). In this case, a path for transmitting and receiving communication data and control information to each subscriber terminal is previously defined.

(EMBODIMENT 3)

Figure 8:
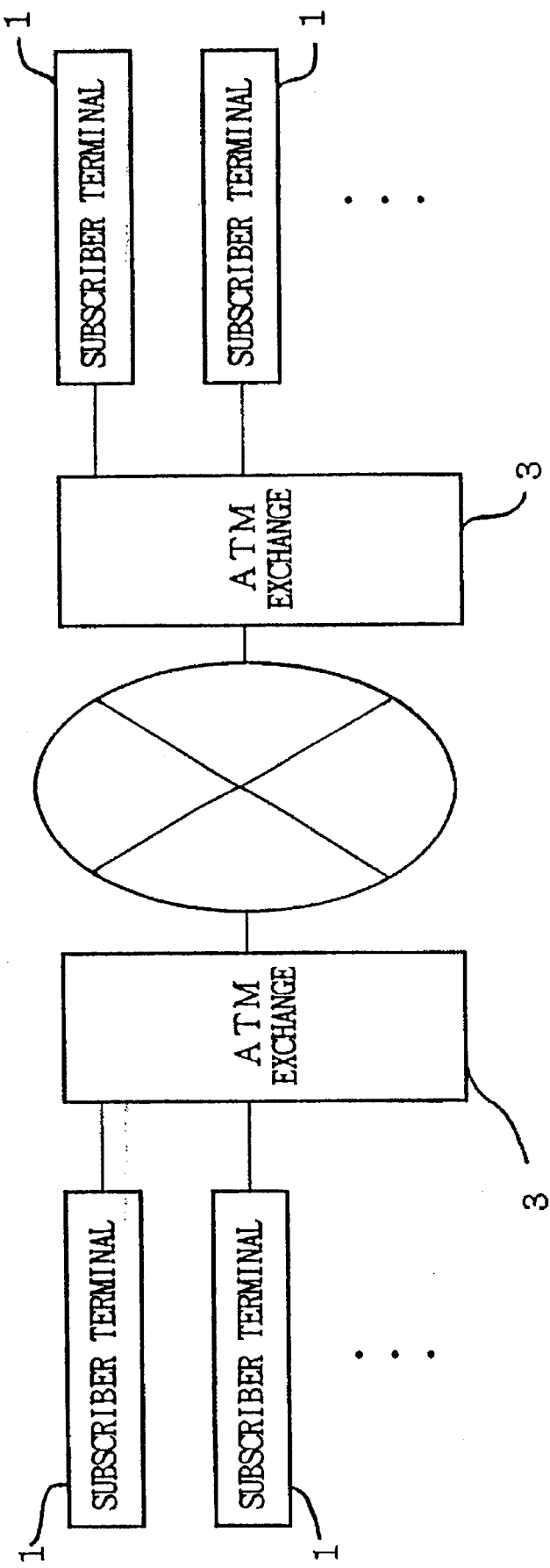
FIG. 8 is an overall block diagram of a communication network in a third embodiment.

FIG. 8 shows the overall structure of a communication network according to a third embodiment of the present invention.

The communication network in the present embodiment 3, in contrast to the previously described second embodiment, incorporates the functions of the network end device 2 into each subscriber terminal 1, and connects the subscriber terminals 1 and the ATM exchanges 3 by means of an SDH system transmission path.

Figure 9:
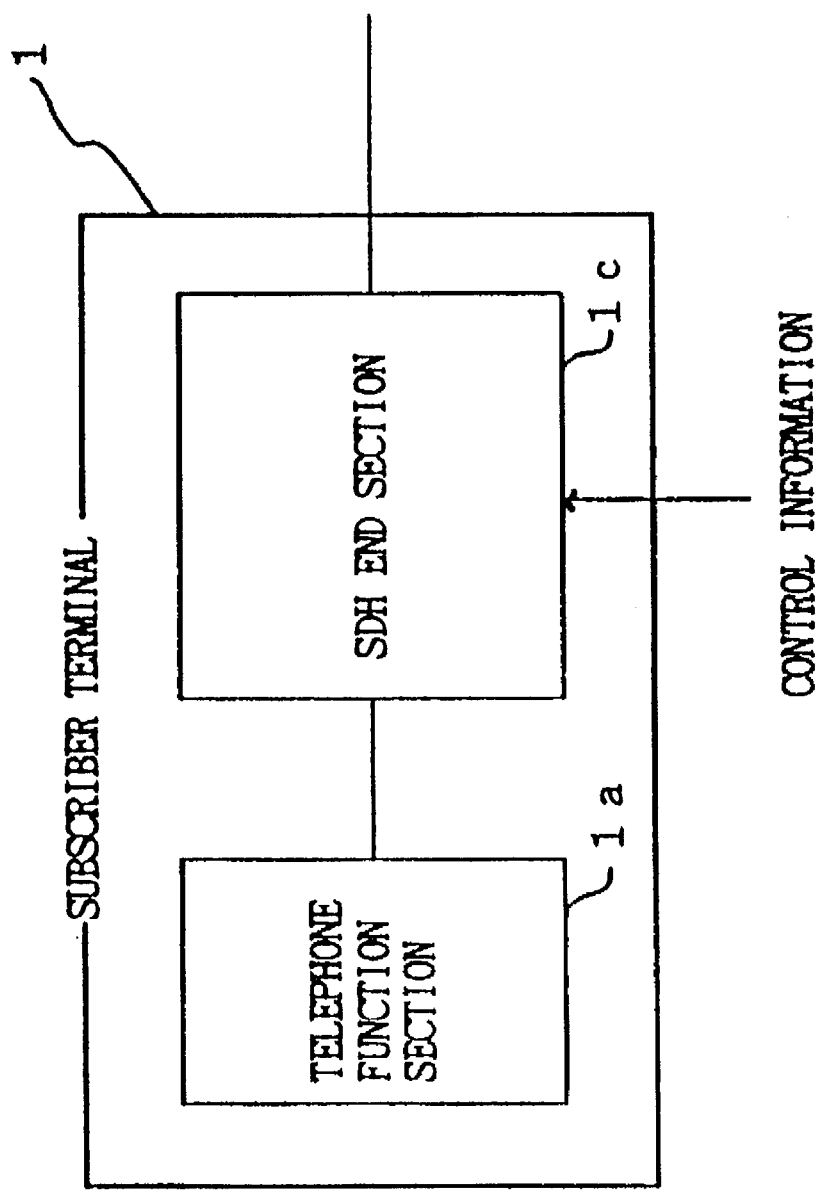
FIG. 9 is a block diagram of a subscriber terminal in a third embodiment.

FIG. 9 is a block drawing showing the various function of the internal structure of a subscriber terminal 1 in the present embodiment.

In this drawing, the subscriber terminal 1 comprises a telephone function section 1a, and an SDH end section 1c for mapping communication data into the payload section of the SDH frame data as well as mapping control information input by the maintenance worker from an input device (for example a microphone, keyboard or the like), not shown, into the overhead section of the SDH frame data.

Also, the SDH end section 1c, where SDH frame data in received from an ATM exchange 3, has a function which separates this SDH frame data into the payload section and overhead section, and transfers the communication data of the payload section to the telephone function section 1a, as well as notifies the maintenance worker via an input device (for example speakers, a display or the like) of the control information of the overhead section.

Functions and structures other than these are the same as in the previously described second embodiment, and explanation thereof will be omitted.

(EMBODIMENT 4)

Figure 10:
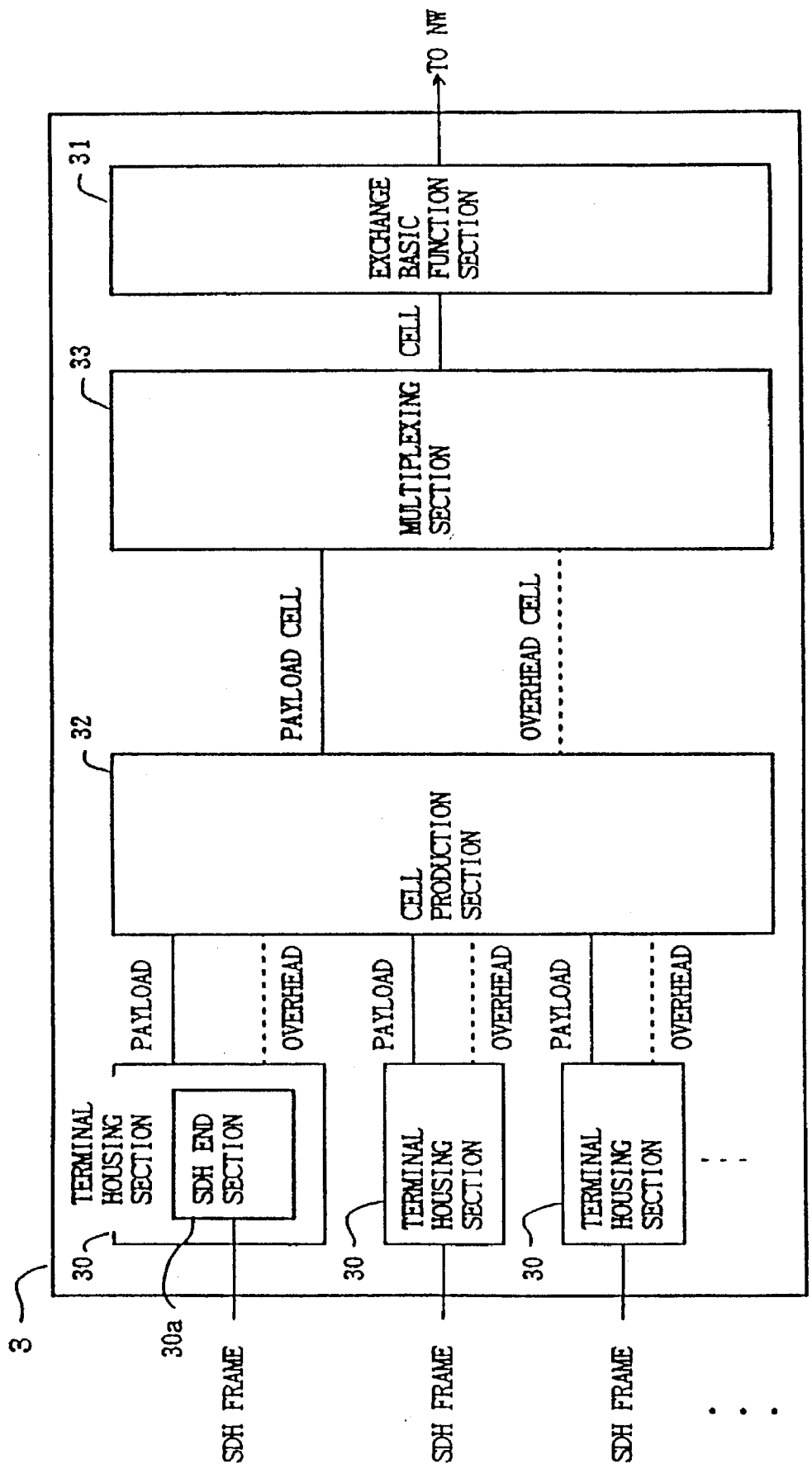
FIG. 10 is a block diagram of an ATM exchange in a fourth embodiment.

The functional structure of the ATM exchange in the fourth embodiment in shown in FIG. 10.

The ATM exchange 3 of this fourth embodiment renders the cell production section 32 and the multiplexing section 33 independent of the terminal housing section 30, with one single cell production section 32 and multiplexing section 33 used commonly for a number of terminal housing sections 30.

Each terminal housing section 30 comprises only the SDH end section 30a, and has a function of separating the SDH frame data transmitted from the subscriber terminal 1 into payload section data and overhead section data, and a function of combining the payload section data and overhead section data restored by the cell production section 32 to produce SDH frame data.

The cell production section 32 has a buffer (not shown) for temporarily storing payload section data and overhead section data transfered from each terminal housing section 30. This buffer has a data region for storing payload section data and a data region for storing overhead section data, each data region separated for each terminal housing section 30. Also, it comprises a function of time-division reading out the data of each data region based on a clock signal and forming them into cells.

Below, the operation procedures of the ATM exchange 3 will be explained.

The ATM exchange 3, upon receiving a designation setting request signal from a subscriber terminal, sets a communication data path as well as a control information path, by the same procedure as that of the above second embodiment.

Then, the terminal housing section 30 receives SDH frame data from the above subscriber terminal 1, divides this SDH frame data into payload section data and overhead section data and transfers them to the cell production section 32.

The cell production section 32, as well as storing the data of the payload section in a data region corresponding to a terminal housing section 30, also stores the data of the overhead section in a data region corresponding to a terminal housing section 30.

Then, the above data regions are accessed based on a clock signal, the data of the payload section are formed into cells, and the data of the overhead section are formed into cells.

The cell production section 32 transfers the cell-formed data to a sequential multiplexing section 33.

The multiplexing section 33 multiplexes the above payload section cells and overhead section cells and transmits them to the receiving end ATM exchange via the exchange basic function section 31.

Meanwhile, where receiving multiplexed cell groups from the receiving end ATM exchange, in the ATM exchange 3 the multiplexing section 33 separates the cell groups into payload section cells and overhead section cells to transfer them to the cell production section 32.

The cell production section 32 the payload section cells and overhead section cells are respectively stored in data regions corresponding to terminal housing sections 30, the cells stored in these data regions are time-division read out based on a clock signal, and the payload section data and overhead section cells are restored.

Further, the cell production section 32 transfers the payload section data and the overhead section cells to a terminal housing section 30 corresponding to a subscriber terminal 1 which is the addressee.

The terminal housing section 30, as well as mapping the payload section data transmitted from the cell production section 32 into the payload section of the SDH frame data, maps the overhead section data into the overhead section of the SDH frame data, preparing SDH frame data. Then, this SDH frame data is transmitted to the subscriber terminal 1.

At this time, in the subscriber terminal 1, the SDH end section 1c extracts the communication data from the payload section of the SDH frame data at the same time as extracting the control information from the overhead section.

Then, notification of the communication data is sent to the subscriber via the telephone function section 1a, and the maintenance worker is notified of the control information via an input device.

What is claimed is:

1. An order wire relay method for a communication network which separates into cells of fixed length and transmits frame data comprising a payload section for registering communication data including at least one of sound, data and images and overhead data for registering control information for maintenance and management, wherein an exchange of the communication network executes the steps of:

a frame data receiving step of receiving frame data;

a data separation step of separating the frame data received in the frame data receiving step into a payload section and an overhead section;

a cell production step of forming the payload section and overhead section separated in the data separation step into individual cells; and a multiplexing step of multiplexing cell groups produced in the cell production step and transmitting them to a receiving end network.

2. An order wire relay method for a communication network which separates into cells of fixed length and transmits frame data comprising a payload section for registering communication data including at least one of sound, data and images and overhead data for registering control information for maintenance and management, a network end device being provided between a subscriber terminal and an exchange, wherein the network end device executes the steps of:

a communication data mapping step of mapping communication data form a subscriber terminal into the payload section of frame data;

a control information mapping step of mapping control information input by a maintenance worker into the overhead section of frame data; and a frame data transmission step of transmitting the frame data to the exchange, and the exchange executes the steps of:

a data separation step of separating the frame data into a payload section and an overhead section;

a payload cell forming step of forming the payload section separated in the data separation step into cells;

an overhead cell forming step of forming the overhead section separated in the data separation step into cells; and a multiplexing step of multiplexing cell groups formed in the payload cell forming step and overhead cell forming step and transmitting them to a receiving end network.

3. The order wire method of claim 1, wherein a network end device is provided between a subscriber terminal and the exchange and wherein the exchange executes:

a cell receiving step of receiving multiplexed cell groups from a receiving end exchange;

a cell identification step of identifying cell groups received in the cell receiving step as payload section cells and overhead section cells;

a payload restoring step of analyzing payload section cells identified in the cell identification step and restoring communication data of the payload section;

an overhead restoring step of analyzing overhead section cells identified in the cell identification step and restoring control information of the overhead section;

a frame data restoring step of combining the payload section restored in the payload restoring step and the overhead section restored in the overhead restoring step to restore original frame data; and a transmission step of transmitting the frame data restored in the frame data restoring step to said network end device.

4. The wire relay method of claim 3, wherein the network end device executes a frame data receiving step of receiving frame data from the exchange;

a frame data separation step of separating the frame data received in the frame data receiving step into payload section data and overhead section data;

a communication data transmission step of transmitting communication data of the payload section to the subscriber terminal; and a control information transmission step of transmitting control information of the overhead section to the maintenance worker.

5. The order wire relay method of claim 1, wherein the cell production step includes a step of forming the overhead section data into cells by means of a CBR method.

6. The order wire relay method of claim 1, wherein the exchange executes a step of setting a communication data designation between a transmitting end subscriber terminal and a receiving end subscriber terminal; and a step of transmitting a designation setting request including terminal identification information specifying the receiving end subscriber terminal to a receiving end exchange and setting a control information designation.

7. An order wire relay apparatus for a communication network which separates into cells of fixed length and transmits frame data comprising a payload section for registering communication data including at least one of sound, data and images and overhead data for registering control information for maintenance and management, wherein an exchange of the communication network comprises:

frame data transmitting/receiving means for transmitting and receiving the frame data;

data separating means for separating the frame data received by the frame data transmitting/receiving means into a payload section and an overhead section;

cell producing means for forming the payload section and overhead section separated by the data separating means into individual cells; and multiplexing means for multiplexing cell groups prepared by the cell producing means and transmitting them to a receiving end network.

8. An order wire relay apparatus for a communication network which separates into cells of fixed length and transmits frame data comprising a payload section for registering communication data including at least one of sound, data and images and overhead data for registering control information for maintenance and management, a network end device being provided between a subscriber terminal and an exchange, wherein the network end device comprises frame data preparing means for simultaneously mapping communication data transmitted from a subscriber terminal in to a payload section of the frame data and mapping control information input by a maintenance worker into an overhead section of the frame data, and transmitting the frame data to the exchange, and the exchange comprises data separating means for separating the frame data into a payload section and an overhead section;

cell producing means for forming the payload section and overhead section separated by the data separating means into individual cells; and multiplexing means for multiplexing cell groups prepared by the cell producing means and transmitting them to a receiving end network.

9. The order wire relay apparatus of claim 7 wherein:

the multiplexing means of the exchange, when receiving multiplexed cell groups from the receiving end network, separates the cell groups into payload section cells and overhead section cells;

the cell producing means analyzes the payload section cells and restores communication data, and analyzes the overhead section cells and restores control information, the data separation means combines the communication data of the payload section and the control information of the overhead section restored by the cell producing means and produces original frame data; and the frame data transmitting/receiving means transmit the frame data produced by the data separating means to a network end device which connects said exchange with a subscriber terminal.

10. The order wire relay apparatus of claim 9, wherein the frame data preparing means of the network end device, when receiving frame data from the exchange, separates the frame data into payload section communication data and overhead section control information, and simultaneously transmits the payload section communication data to the subscriber terminal and the overhead section control information to the maintenance worker.

11. The order wire relay apparatus of claim 7, wherein the cell producing means forms the overhead section data into cells by means of a CBR method.

12. The order wire relay apparatus of claim 7, wherein the exchange, after setting a communication data designation between a subscriber terminal and a receiving end subscriber terminal, transmits a designation setting request including terminal identification information specifying the subscriber terminal to the receiving end network and sets a control information designation.

* * * * *